US008484622B2

(12) United States Patent
Kuboki et al.

(10) Patent No.: US 8,484,622 B2
(45) Date of Patent: Jul. 9, 2013

(54) DEFECT PREDICATE EXPRESSION EXTRACTION

(75) Inventors: Mutsugu Kuboki, Niigata (JP); Yuki Kurokawa, Kyoto (JP); Takuma Marakami, Kanagawa (JP); Tetsuya Nasukawa, Kanagawa (JP); Yuya Unno, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/087,639

(22) Filed: Apr. 15, 2011

(65) Prior Publication Data
US 2011/0265065 A1 Oct. 27, 2011

(30) Foreign Application Priority Data
Apr. 27, 2010 (JP) ................................. 2010-101663

(51) Int. Cl.
*G06F 9/44* (2006.01)
(52) U.S. Cl.
USPC ............................... 717/131; 704/9; 707/737
(58) Field of Classification Search
None
See application file for complete search history.

(56) References Cited

U.S. PATENT DOCUMENTS

| 5,761,631 | A  | * | 6/1998  | Nasukawa ........................ 704/9 |
| 7,493,252 | B1 | * | 2/2009  | Nagano et al. .................... 704/9 |
| 7,546,310 | B2 | * | 6/2009  | Tsuboi et al. ....................... 1/1 |
| 7,792,841 | B2 | * | 9/2010  | McAllister et al. ........... 707/749 |
| 7,818,723 | B2 | * | 10/2010 | AliKacem et al. ............ 717/131 |
| 7,930,302 | B2 | * | 4/2011  | Bandaru et al. ............... 707/737 |
| 2004/0268318 | A1 | * | 12/2004 | Sirbu ............................. 717/131 |
| 2005/0091038 | A1 | * | 4/2005  | Yi et al. ........................... 704/10 |
| 2005/0187932 | A1 | * | 8/2005  | Kanayama et al. ............... 707/6 |
| 2006/0112134 | A1 | * | 5/2006  | Tsuboi et al. .................. 707/102 |
| 2007/0162397 | A1 | * | 7/2007  | Nasukawa et al. .............. 705/54 |
| 2008/0109214 | A1 |   | 5/2008  | Shaw |
| 2008/0154883 | A1 | * | 6/2008  | Chowdhury et al. ............. 707/5 |
| 2008/0249764 | A1 | * | 10/2008 | Huang et al. ...................... 704/9 |
| 2008/0256063 | A1 | * | 10/2008 | Nasukawa et al. ................ 707/5 |
| 2008/0270116 | A1 |   | 10/2008 | Godbole et al. |
| 2009/0164417 | A1 |   | 6/2009  | Nigam et al. |
| 2009/0192784 | A1 | * | 7/2009  | Cole et al. ......................... 704/9 |
| 2009/0282019 | A1 |   | 11/2009 | Galitsky et al. |
| 2009/0306967 | A1 |   | 12/2009 | Nicolov et al. |
| 2010/0242028 | A1 | * | 9/2010  | Weigert ........................ 717/131 |
| 2011/0040759 | A1 | * | 2/2011  | Rappoport et al. ........... 707/737 |
| 2011/0161937 | A1 | * | 6/2011  | Bounimova et al. .......... 717/131 |

FOREIGN PATENT DOCUMENTS
JP 2005235014 9/2005

OTHER PUBLICATIONS

Parikh et al., "Sentiment Analysis of User-Generated Twitter Updates using Various Classification Techniques", 2009, pp. 1-18.*

(Continued)

*Primary Examiner* — Thuy Dao
*Assistant Examiner* — Stephen Berman
(74) *Attorney, Agent, or Firm* — Vazken Alexanian

(57) ABSTRACT

A defect predicate expression extraction device. The device extracts, as candidates for predicate expressions representing defects, predicate expressions occurring in the neighborhood of predicate modifying expressions representing suddenness or predicate modifying expressions representing repeatability. The defect predicate expression extraction device further extracts, as predicate expressions representing normality, predicate expressions occurring in the neighborhood of predicate modifying expressions representing normality and extracts predicate expressions representing defects by removing the predicate expressions representing normality from a list of the candidates for predicate expressions representing defects.

20 Claims, 9 Drawing Sheets

OTHER PUBLICATIONS

Jia et al., "The Effect of Negation on Sentiment Analysis and Retrieval Effectiveness", 2009, CIKM'09, Nov. 2-6, 2009, Hong Kong, China, ACM 978-1-60558-512-3/09/11, pp. 1827-1830.*

Saggion et al., "Extracting Opinions and Facts for Business Intelligence", Department of Computer Science University of Sheffield, 2009, pp. 1-28.*

V.S. Subrahmanian et al., AVA: Adjective-Verb-Adverb Combinations for Sentiment Analysis, IEEE Intelligent Systems, Jul./Aug. 2008, pp. 43-50, vol. 23, No. 4, IEEE.

Benamara et al., Sentiment Analysis: Adjectives and Adverbs are better than Adjectives Alone, Proceedings of the International Conference on Weblogs . . . , 2007, ICWSM.

Sakai et al., Extraction of Expressions concerning Accident Cause contained in Articles on Traffic Accidents, Journal of natural language processing, Apr. 2006, V. 13, No. 2.

S.D. Saeger et al., Proceedings of the 22nd International Conference on Computational Linguistics (Coling2008), pp. 185-192, Aug. 2008, Manchester.

Kakimoto et al., Extraction of trouble information from daily reports by using syntactic pieces, Association Natural Language Processing, Proceedings of 14th . . . Mar. 2008.

Mitsuharu et al.,Troubleshoot Document Extraction Using Sentence Structures of Web Forums, Information Processing Society of Japan, In Proceedings of the 70th IPSJ, Mar. 2008.

* cited by examiner

FIG. 2

(SENTENCE 1)

Aisha-no-bureeki-ga [ikinari]{205} koosoku-dooro-de [kowareta]{210}

(The brake of my car was suddenly broken on the highway)

(SENTENCE 2)

Koobu-zaseki-no [mado-garasu]{215} -ga totsuzen [wareta]{220}

(The rear seat window was unexpectedly broken)

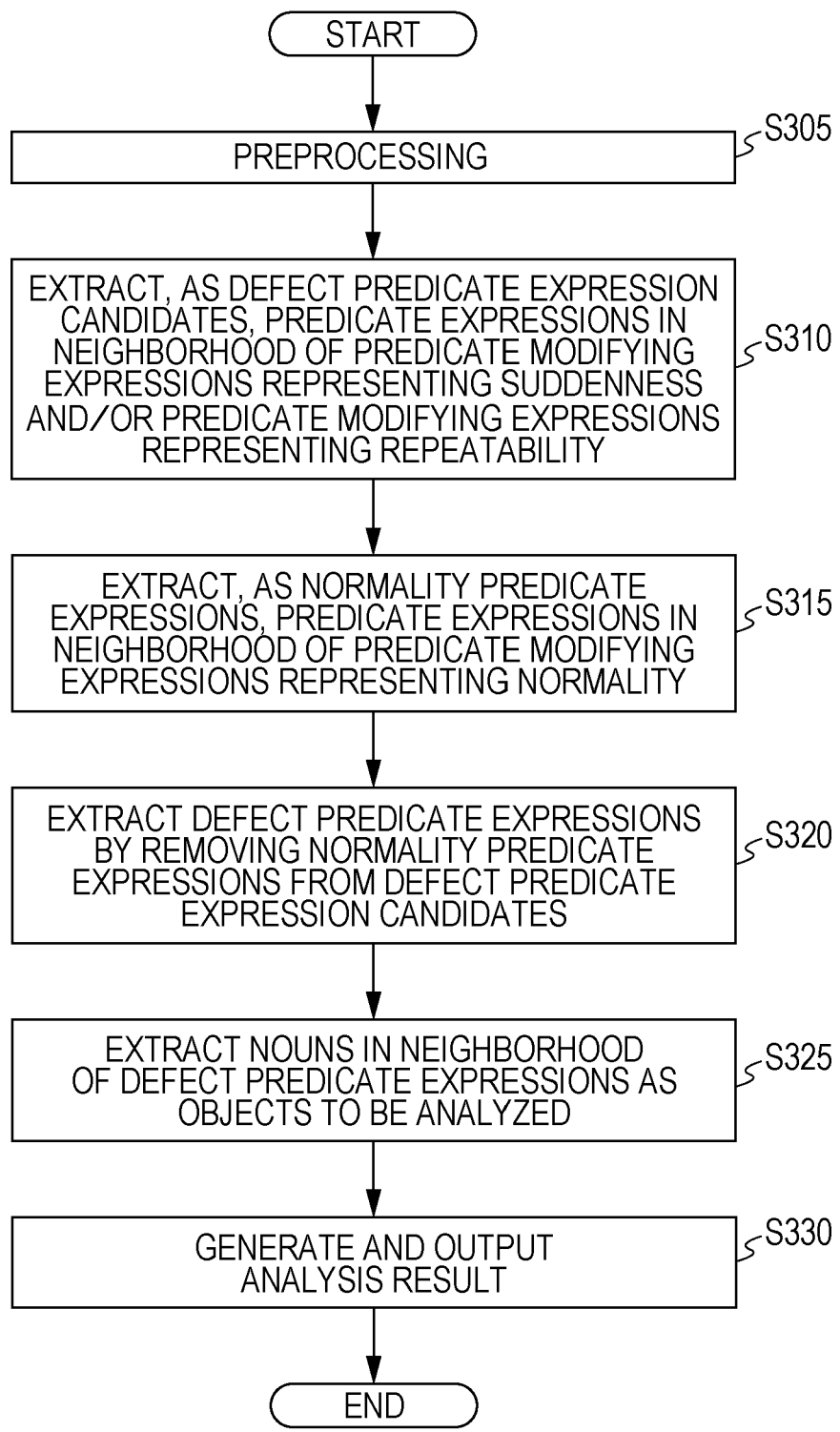

FIG. 4   405

| | KNOWN METHOD (FREQUENT VERBS) | | PRESENT INVENTION PRIOR TO (NOISE PROCESSING) | | PRESENT INVENTION (POSTERIOR TO NOISE PROCESSING) | |
|---|---|---|---|---|---|---|
| | NUMBER OF DEFECT PREDICATE EXPRESSIONS | ACCURACY | NUMBER OF DEFECT PREDICATE EXPRESSIONS | ACCURACY | NUMBER OF DEFECT PREDICATE EXPRESSIONS | ACCURACY |
| KOMPYUUTA (JAPANESE) (COMPUTER) | 64/2000 | 3.2% | 28/385 (−81%) | 7.3% (+4.1) | 21/92 (−95%) | 22.8% (+15.5) |
| KURUMA (JAPANESE) (CAR) | 157/525 | 29.9% | 58/160 (−70%) | 36.2% (+6.3) | 47/92 (−83%) | 51.0% (+14.8) |
| COMPUTER (ENGLISH) | 65/2041 | 3.1% | 28/310 (−85%) | 9.0% (+5.9) | 21/121 (−94%) | 17.3% (+14.2) |
| CAR (ENGLISH) | 72/620 | 11.6% | 61/399 (−36%) | 15.2% (+3.6) | 50/190 (−69%) | 26.3% (+14.7) |

FIG. 5A

| Subcategories/Keywords | HASSEI-SURU (OCCUR) 2237 | TEISHI-SURU (STOP) 2010 | OKURERU (DELAY) 1346 | TENTOO-SURU (ILLUMINATE) 1315 | FUMU (STEP ON) 1122 | KIKU (TAKE EFFECT) 1118 | ENSUTO-SURU (ENGINE STALLS) 1112 | SHIMAU (STORE) 900 | DERU (GO OUT) 857 | HASON-SURU (IS BROKEN) 799 | HAZURERU (COME OFF) 762 | HAIRU (ENTER) 709 | SHIDOO-SURU (START) 645 | AGARU (GO UP) 617 |
|---|---|---|---|---|---|---|---|---|---|---|---|---|---|---|
| 558 | | | | | | | | | | | | | | |
| ModelA 442 | 61 (0.9) | 44 (0.7) | 45 (1.0) | 28 (0.6) | 15 (0.3) | 16 (0.3) | 11 (0.2) | 8 (0.1) | 19 (0.5) | 20 (0.6) | 14 (0.4) | 25 (0.9) | 23 (0.9) | 10 (0.3) |
| ModelB 392 | 45 (0.8) | 38 (0.7) | 14 (0.3) | 10 (0.2) | 27 (0.3) | 27 (0.8) | 20 (0.6) | 17 (0.6) | 17 (0.6) | 11 (0.4) | 31 (1.4) | 14 (0.6) | 14 (0.6) | 5 (0.1) |
| ModelC 359 | 25 (0.4) | 82 (1.9) | 13 (0.3) | 4 (0.0) | 22 (0.7) | 28 (1.0) | 41 (1.6) | 12 (0.4) | 15 (0.6) | 17 (0.7) | 10 (0.4) | 10 (0.4) | 24 (1.4) | 7 (0.2) |
| ModelD 295 | 32 (0.6) | 64 (1.6) | 6 (0.1) | 20 (0.6) | 14 (0.4) | 13 (0.4) | 44 (1.0) | 12 (0.4) | 9 (0.3) | 15 (0.7) | 9 (0.3) | 5 (0.1) | 12 (0.6) | 14 (0.8) |
| ModelE 279 | 30 (0.7) | 29 (0.7) | 18 (0.6) | 14 (0.4) | 14 (0.5) | 9 (0.3) | 9 (0.3) | 9 (0.4) | 14 (0.7) | 7 (0.2) | 8 (0.3) | 10 (0.5) | 10 (0.6) | 6 (0.2) |
| ModelF 256 | 44 (1.2) | 9 (0.7) | 15 (0.5) | 20 (0.8) | 15 (0.6) | 15 (0.6) | 10 (0.4) | 7 (0.2) | 2 (0.0) | 10 (0.5) | 3 (0.1) | 8 (0.3) | 6 (0.2) | 5 (0.2) |
| ModelG 234 | 10 (0.2) | 14 (0.3) | 8 (0.2) | 14 (0.4) | 29 (1.5) | 4 (0.1) | 7 (0.2) | 10 (0.5) | 26 (1.8) | 4 (0.1) | 4 (0.1) | 7 (0.3) | 5 (0.2) | 15 (1.2) |
| N/A 217 | 18 (0.5) | 10 (0.2) | 5 (0.1) | 19 (0.8) | 12 (0.5) | 5 (0.1) | 2 (0.0) | 11 (0.6) | 10 (0.5) | 11 (0.7) | 15 (1.2) | 11 (0.8) | 13 (1.0) | 11 (0.9) |
| ModelH 217 | 9 (0.2) | 11 (0.3) | 18 (0.8) | 6 (0.1) | 12 (0.6) | 15 (0.8) | 6 (0.2) | 9 (0.5) | 9 (0.5) | 8 (0.4) | 1 (0.0) | 10 (0.7) | 1 (0.0) | 5 (0.2) |
| ModelI 212 | 27 (0.8) | 10 (0.3) | 13 (0.5) | 13 (0.6) | 17 (0.9) | 20 (1.1) | 1 (0.0) | 8 (0.4) | 8 (0.4) | 3 (0.1) | 1 (0.0) | 5 (0.2) | 5 (0.2) | 5 (0.2) |
| ModelJ 209 | 32 (1.1) | 15 (0.4) | 11 (0.4) | 10 (0.4) | 8 (0.3) | 4 (0.1) | 5 (0.1) | 8 (0.3) | 2 (0.0) | 1 (0.0) | 1 (0.0) | 4 (0.1) | 4 (0.1) | 6 (0.3) |
| ModelK 208 | 26 (0.8) | 16 (0.5) | 10 (0.4) | 7 (0.2) | 9 (0.4) | 6 (0.2) | 11 (0.5) | 8 (0.3) | 6 (0.2) | 2 (0.0) | 1 (0.0) | 4 (0.1) | 5 (0.2) | 2 (0.0) |
| 14 (0.4) | 23 (0.8) | 6 (0.1) | 33 (1.9) | 14 (0.3) | 3 (0.0) | 20 (1.2) | 8 (0.4) | 11 (0.7) | 10 (0.7) | 2 (0.0) | 3 (0.1) | 5 (0.2) | 8 (0.5) | |

| SADOO-SURU (OPERATE) 596 | TOMARU (STOP) 576 | UGOKU (MOVE) 557 | KAKARU (HANG ON) 538 | SOOKOO-SURU (RUN) 536 | DEKIRU (CAN) 528 | KOOKAN-SURU (REPLACE) 479 | KASOKU-SURU (ACCELERATE) 455 | KIRU (TURN OFF) 449 | KIRERU (TURN OFF) 433 | IRERU (TURN ON) 431 | KAKERU (APPLY) 423 | HIRAKU (OPEN) 414 | KURU (COME) 357 | DATSURAKU-SURU (DROP) 351 | TEISHA-SURU (STOP CAR) 345 | OKOSU (CAUSE) 340 |
|---|---|---|---|---|---|---|---|---|---|---|---|---|---|---|---|---|
| 15 (0.6) | 3 (0.0) | 16 (0.7) | 12 (0.5) | 12 (0.5) | 11 (0.4) | 6 (0.2) | 8 (0.3) | 4 (0.1) | 8 (0.3) | 7 (0.2) | 9 (0.4) | 10 (0.5) | 3 (0.0) | 12 (0.7) | 5 (0.2) | 4 (0.1) |
| 12 (0.5) | 11 (0.5) | 9 (0.4) | 7 (0.2) | 13 (0.7) | 9 (0.4) | 13 (0.7) | 2 (0.0) | 15 (1.0) | 23 (1.7) | 10 (0.6) | 12 (0.8) | 5 (0.2) | 4 (0.1) | 3 (0.1) | 6 (0.3) | 9 (0.6) |
| 3 (0.0) | 14 (0.8) | 4 (0.1) | 14 (0.8) | 13 (0.7) | 4 (0.1) | 8 (0.4) | 9 (0.5) | 5 (0.2) | 12 (0.8) | 5 (0.2) | 11 (0.8) | 3 (0.1) | 3 (0.1) | 9 (0.7) | 9 (0.7) | 6 (0.3) |
| 2 (0.0) | 9 (0.5) | 7 (0.3) | 9 (0.5) | 1 (0.0) | 8 (0.3) | 7 (0.3) | 12 (0.9) | 1 (0.0) | 1 (0.0) | 10 (0.7) | 4 (0.1) | 6 (0.3) | 3 (0.1) | 3 (0.1) | 6 (0.3) | 3 (0.1) |
| 7 (0.3) | 5 (0.2) | 9 (0.6) | 10 (0.7) | 11 (0.8) | 2 (0.0) | 6 (0.3) | 13 (1.2) | 6 (0.3) | 5 (0.2) | 6 (0.3) | 5 (0.2) | 2 (0.0) | 7 (0.5) | 4 (0.2) | 3 (0.1) | 2 (0.0) |
| 5 (0.2) | 7 (0.4) | 6 (0.3) | 7 (0.4) | 2 (0.0) | 5 (0.2) | 4 (0.1) | 1 (0.0) | 3 (0.1) | 2 (0.0) | 2 (0.0) | 3 (0.1) | 2 (0.0) | 5 (0.3) | 1 (0.0) | 2 (0.0) | 3 (0.1) |
| 1 (0.0) | 3 (0.1) | 5 (0.2) | 5 (0.2) | 9 (0.7) | 7 (0.4) | 4 (0.2) | 31 (4.1) | 3 (0.1) | 0 (0.0) | 12 (1.3) | 0 (0.0) | 0 (0.0) | 3 (0.1) | 2 (0.0) | 3 (0.1) | 1 (0.0) |
| 9 (0.7) | 5 (0.2) | 15 (1.5) | 5 (0.2) | 5 (0.2) | 2 (0.0) | 4 (0.2) | 3 (0.1) | 1 (0.0) | 3 (0.1) | 5 (0.3) | 1 (0.0) | 6 (0.4) | 2 (0.0) | 5 (0.4) | 5 (0.4) | 1 (0.0) |
| 4 (0.1) | 8 (0.6) | 6 (0.3) | 3 (0.1) | 6 (0.3) | 4 (0.2) | 5 (0.3) | 1 (0.0) | 2 (0.0) | 5 (0.3) | 4 (0.2) | 2 (0.0) | 5 (0.3) | 3 (0.1) | 1 (0.0) | 4 (0.2) | 6 (0.5) |
| 5 (0.2) | 2 (0.0) | 7 (0.4) | 5 (0.2) | 3 (0.1) | 7 (0.5) | 6 (0.4) | 1 (0.0) | 3 (0.1) | 0 (0.0) | 6 (0.4) | 10 (1.2) | 5 (0.3) | 1 (0.0) | 0 (0.0) | 3 (0.1) | 5 (0.4) |
| 1 (0.0) | 7 (0.4) | 2 (0.0) | 0 (0.0) | 4 (0.2) | 3 (0.1) | 3 (0.1) | 6 (0.4) | 9 (1.0) | 2 (0.0) | 1 (0.0) | 3 (0.1) | 4 (0.2) | 5 (0.4) | 2 (0.0) | 6 (0.6) | 1 (0.0) |
| 7 (0.4) | 1 (0.0) | 3 (0.1) | 5 (0.3) | 8 (0.6) | 4 (0.2) | 6 (0.4) | 4 (0.2) | 6 (0.4) | 3 (0.1) | 4 (0.2) | 2 (0.0) | 8 (0.8) | 7 (0.7) | 0 (0.0) | 2 (0.0) | 1 (0.0) |
| 7 (0.4) | 8 (0.6) | 12 (1.2) | 3 (0.1) | 2 (0.0) | 8 (0.6) | 5 (0.3) | 3 (0.1) | 5 (0.3) | 5 (0.3) | 8 (0.8) | 3 (0.1) | 5 (0.3) | 4 (0.3) | 0 (0.0) | 7 (0.7) | 5 (0.4) |

FROM FIG. 5A

| Subcategories/Keywords | HASSEI-SURU (OCCUR) 2237 | TEISHI-SURU (STOP) 2010 | MORERU (LEAK) 1346 | ENSUTO-SURU (ENGINE STALL) 1112 | HASON-SURU (IS BROKEN) 799 | HAZURERU (COME OFF) 762 | SOOKOO-SURU (RUN) 536 | DATSURAKU-SURU (DROP) 351 | TEISHA-SURU (STOP CAR) 345 | OKOSU (CAUSE) 340 | ORERU (IS BROKEN) 327 | KOSHOO-SURU (FAIL) 300 | KOWARERU (IS BROKEN) 287 | HASSHIN-SURU (DEPART) 265 | NUKERU (COME OFF) 265 |
|---|---|---|---|---|---|---|---|---|---|---|---|---|---|---|---|
| 558 | 61 (0.9) | 44 (0.7) | 45 (1.0) | 11 (0.2) | 20 (0.6) | 14 (0.4) | 12 (0.5) | 12 (0.7) | 5 (0.2) | 4 (0.1) | 9 (0.5) | 5 (0.2) | 7 (0.3) | 2 (0.0) | 3 (0.1) |
| ModelA 442 | 45 (0.8) | 38 (0.7) | 14 (0.3) | 20 (0.6) | 11 (0.4) | 31 (1.4) | 13 (0.7) | 3 (0.1) | 6 (0.3) | 9 (0.6) | 3 (0.1) | 5 (0.2) | 5 (0.2) | 5 (0.2) | 9 (0.8) |
| ModelB 392 | 25 (0.4) | 82 (1.9) | 13 (0.3) | 41 (1.6) | 17 (0.7) | 10 (0.4) | 13 (0.7) | 9 (0.7) | 9 (0.7) | 6 (0.3) | 6 (0.3) | 5 (0.2) | 6 (0.4) | 2 (0.0) | 1 (0.0) |
| ModelC 359 | 32 (0.6) | 64 (1.6) | 6 (0.1) | 44 (1.8) | 15 (0.7) | 9 (0.3) | 1 (0.0) | 3 (0.1) | 6 (0.3) | 3 (0.1) | 4 (0.2) | 4 (0.2) | 5 (0.3) | 5 (0.3) | 2 (0.0) |
| ModelD 295 | 30 (0.7) | 29 (0.7) | 18 (0.6) | 9 (0.3) | 7 (0.2) | 8 (0.3) | 11 (0.1) | 4 (0.2) | 3 (0.1) | 2 (0.0) | 0 (0.0) | 4 (0.2) | 4 (0.2) | 6 (0.5) | 4 (0.2) |
| ModelE 279 | 44 (1.2) | 9 (0.7) | 15 (0.5) | 10 (0.4) | 10 (0.5) | 10 (0.5) | 2 (0.0) | 1 (0.0) | 2 (0.0) | 3 (0.1) | 4 (0.2) | 2 (0.0) | 3 (0.1) | 2 (0.0) | 3 (0.1) |
| ModelF 256 | 10 (0.2) | 14 (0.3) | 8 (0.2) | 7 (0.2) | 4 (0.1) | 3 (0.1) | 9 (0.7) | 1 (0.0) | 3 (0.1) | 3 (0.1) | 5 (0.3) | 3 (0.1) | 4 (0.3) | 15 (2.8) | 3 (0.1) |
| ModelG 234 | 18 (0.5) | 10 (0.2) | 5 (0.1) | 2 (0.0) | 11 (0.7) | 4 (0.1) | 5 (0.2) | 2 (0.0) | 5 (0.2) | 1 (0.0) | 2 (0.0) | 6 (0.6) | 4 (0.3) | 2 (0.1) | 2 (0.1) |
| N/A 217 | 9 (0.2) | 11 (0.3) | 18 (0.8) | 6 (0.2) | 8 (0.4) | 15 (0.8) | 6 (0.3) | 5 (0.4) | 4 (0.2) | 1 (0.0) | 6 (0.6) | 2 (0.1) | 2 (0.1) | 1 (0.0) | 6 (0.7) |
| ModelH 217 | 27 (0.8) | 10 (0.3) | 13 (0.5) | 1 (0.0) | 3 (0.1) | 1 (0.0) | 3 (0.1) | 1 (0.0) | 3 (0.1) | 5 (0.4) | 0 (0.0) | 0 (0.0) | 0 (0.0) | 5 (0.5) | 3 (0.2) |
| ModelI 212 | 32 (1.1) | 15 (0.4) | 11 (0.4) | 5 (0.1) | 1 (0.0) | 1 (0.0) | 4 (0.2) | 0 (0.0) | 6 (0.6) | 1 (0.0) | 0 (0.0) | 1 (0.0) | 2 (0.1) | 1 (0.0) | 2 (0.1) |
| ModelJ 209 | 26 (0.8) | 16 (0.5) | 10 (0.4) | 11 (0.5) | 2 (0.0) | 1 (0.0) | 8 (0.6) | 2 (0.1) | 2 (0.0) | 1 (0.0) | 2 (0.1) | 2 (0.1) | 0 (0.0) | 1 (0.0) | 3 (0.2) |
| ModelK 208 | 14 (0.4) | 23 (0.8) | 6 (0.1) | 20 (1.2) | 10 (0.7) | 2 (0.0) | 2 (0.0) | 1 (0.0) | 7 (0.7) | 5 (0.4) | 2 (0.1) | 2 (0.1) | 5 (0.5) | 3 (0.2) | 3 (0.2) |

FIG. 6B

| ROKU-SURU (IS LOCKED) 259 | HENSOKU-SURU (CHANGE SPEED) 237 | SHUKKA-SURU (FIRE OCCURS) 231 | SHINDOO-SURU (VIBRATE) 223 | SAGARU (GO DOWN) 212 | YAKITSUKU (SEIZE UP) 176 | WARERU (IS BROKEN) 176 | SHOOJIRU (OCCUR) 173 | SHOOTOTSU-SURU (COLLIDE) 164 | JOOSHOO-SURU (GO UP) 161 | KOOTAI-SURU (BACK) 149 | OOBAHIITO-SURU (OVERHEAT) 145 | KYUUHASSHIN-SURU (START ABRUPTLY) 138 | MAGARU (BEND) 132 | TEIKA-SURU (FALL) 125 | SUBERU (SLIP) 121 |
|---|---|---|---|---|---|---|---|---|---|---|---|---|---|---|---|
| 7 (0.4) | 8 (0.5) | 11 (1.0) | 8 (0.5) | 7 (0.4) | 8 (0.7) | 3 (0.1) | 4 (0.2) | 0 (0.0) | 1 (0.0) | 1 (0.0) | 4 (0.2) | 3 (0.1) | 4 (0.3) | 3 (0.1) | 2 (0.1) |
| 3 (0.1) | 10 (1.0) | 4 (0.2) | 3 (0.1) | 2 (0.0) | 2 (0.0) | 2 (0.1) | 3 (0.1) | 5 (0.4) | 0 (0.0) | 6 (0.6) | 3 (0.2) | 4 (0.3) | 3 (0.2) | 4 (0.3) | 4 (0.3) |
| 4 (0.2) | 2 (0.0) | 3 (0.1) | 3 (0.1) | 2 (0.0) | 11 (1.8) | 2 (0.1) | 1 (0.0) | 1 (0.0) | 5 (0.5) | 3 (0.2) | 1 (0.0) | 2 (0.1) | 1 (0.0) | 0 (0.0) | 0 (0.0) |
| 0 (0.0) | 1 (0.0) | 6 (0.6) | 4 (0.2) | 1 (0.0) | 1 (0.0) | 4 (0.3) | 4 (0.3) | 1 (0.0) | 6 (0.7) | 5 (0.5) | 1 (0.0) | 5 (0.6) | 1 (0.0) | 2 (0.1) | 1 (0.0) |
| 2 (0.0) | 6 (0.6) | 3 (0.2) | 3 (0.2) | 3 (0.2) | 3 (0.1) | 2 (0.1) | 2 (0.1) | 1 (0.0) | 1 (0.0) | 1 (0.0) | 1 (0.0) | 1 (0.0) | 3 (0.3) | 2 (0.1) | 2 (0.1) |
| 2 (0.0) | 3 (0.1) | 0 (0.0) | 2 (0.1) | 4 (0.3) | 0 (0.0) | 0 (0.0) | 1 (0.0) | 3 (0.2) | 2 (0.1) | 2 (0.1) | 1 (0.0) | 1 (0.0) | 1 (0.0) | 1 (0.0) | 0 (0.0) |
| 1 (0.0) | 19 (4.3) | 1 (0.0) | 0 (0.0) | 1 (0.0) | 1 (0.0) | 0 (0.0) | 2 (0.0) | 0 (0.0) | 3 (0.2) | 2 (0.1) | 1 (0.0) | 9 (2.7) | 0 (0.0) | 2 (0.1) | 13 (5.1) |
| 1 (0.0) | 4 (0.3) | 7 (1.1) | 1 (0.0) | 10 (2.2) | 1 (0.0) | 2 (0.1) | 1 (0.0) | 1 (0.0) | 4 (0.5) | 0 (0.0) | 6 (1.2) | 1 (0.0) | 0 (0.0) | 1 (0.0) | 0 (0.0) |
| 2 (0.1) | 1 (0.0) | 0 (0.0) | 2 (0.1) | 1 (0.0) | 1 (0.0) | 1 (0.0) | 3 (0.3) | 4 (0.5) | 1 (0.0) | 4 (0.6) | 0 (0.0) | 0 (0.0) | 2 (0.1) | 1 (0.0) | 1 (0.0) |
| 3 (0.2) | 0 (0.0) | 2 (0.1) | 8 (1.4) | 3 (0.2) | 2 (0.1) | 3 (0.3) | 1 (0.0) | 1 (0.0) | 1 (0.0) | 0 (0.0) | 0 (0.0) | 0 (0.0) | 0 (0.0) | 2 (0.1) | 0 (0.0) |
| 0 (0.0) | 5 (0.6) | 1 (0.0) | 6 (0.9) | 3 (0.2) | 0 (0.0) | 3 (0.3) | 2 (0.1) | 4 (0.5) | 0 (0.0) | 1 (0.0) | 0 (0.0) | 1 (0.07) | 4 (0.7) | 0 (0.0) | 1 (0.0) |
| 1 (0.0) | 1 (0.0) | 0 (0.0) | 2 (0.1) | 1 (0.0) | 0 (0.0) | 3 (0.3) | 2 (0.1) | 0 (0.0) | 1 (0.0) | 1 (0.0) | 11 (4.2) | 2 (0.1) | 0 (0.0) | 0 (0.0) | 1 (0.0) |
| 1 (0.0) | 3 (0.2) | 0 (0.0) | 2 (0.1) | 1 (0.0) | 5 (0.3) | 3 (0.3) | 2 (0.1) | 0 (0.0) | 1 (0.0) | 1 (0.0) | 0 (0.0) | 2 (0.1) | 2 (0.1) | 1 (0.0) | 1 (0.0) |

FROM FIG. 6A

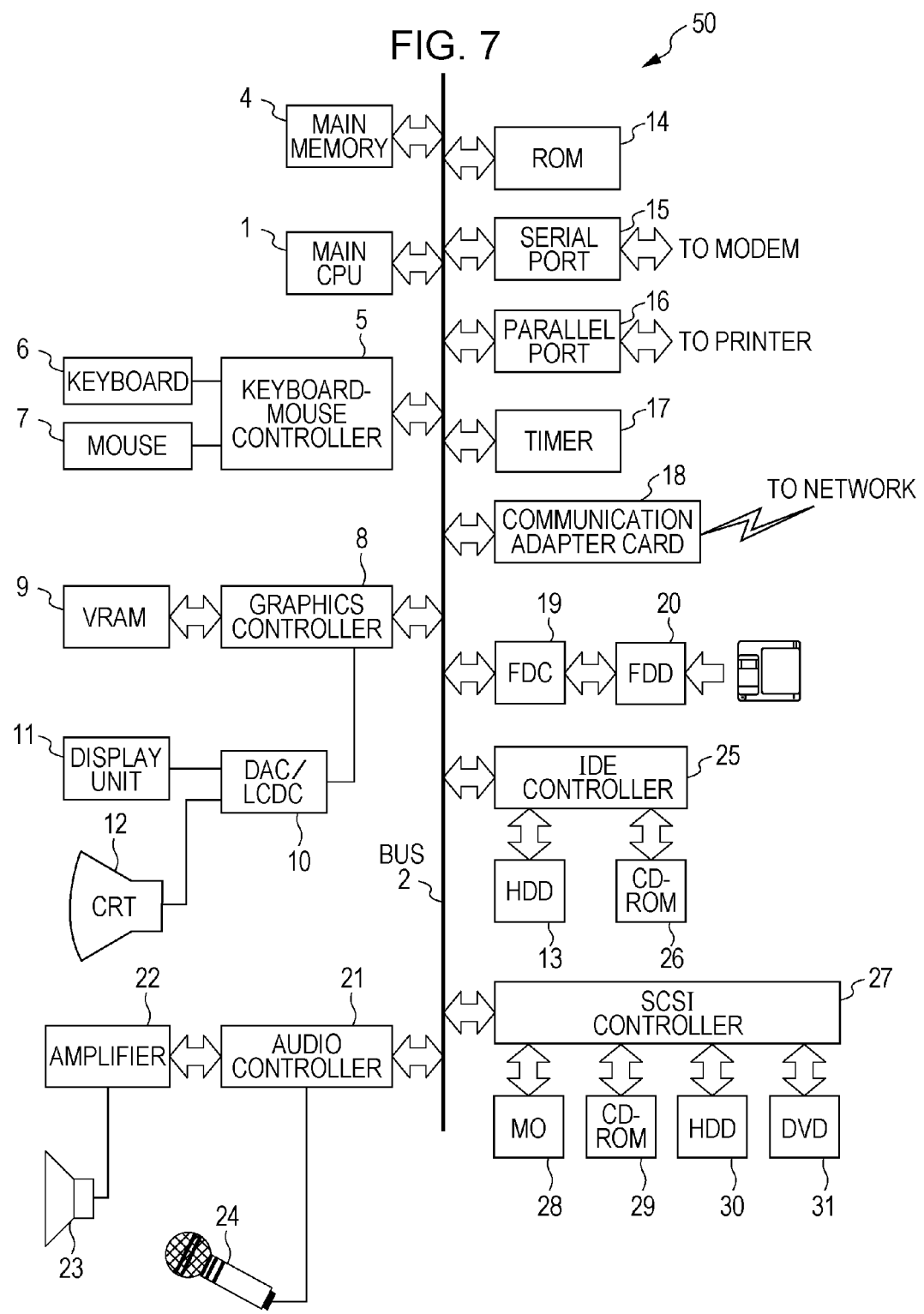

DEFECT PREDICATE EXPRESSION EXTRACTION

CROSS REFERENCE TO RELATED APPLICATION

This application claims priority under 35 U.S.C. 119 from Japanese Application 2010-101663, filed Apr. 27, 2010, the entire contents of which are herein incorporated by reference.

BACKGROUND OF THE INVENTION

1. Field of the Invention

The present invention relates to a technique for extracting predicate expressions representing defects from text data related to use of products belonging to a specific product area.

2. Description of Related Art

Recently, defect detection techniques for detecting defects occurring in company's products by analyzing through text mining the data of users' voices about use of products, for example, report data from users in bulletin boards, complaint sites, and the like or inquiry data in a customer support center, have attracted attention. Early detection of defects enables an earlier response and thus can improve company's competitive power by preventing losses and impairment of reputation.

In defect detection techniques based on text mining, expressions about defects are extracted from a huge number of expressions occurring in a huge amount of text data, and, for example, a deviation and a change in the distribution of the extracted expressions are captured to finally detect defects to be attended to. In general, a dictionary of expressions related to defects to be extracted is manually created. However, expressions about defects vary widely and with the product area. Thus, it is difficult to manually create the dictionary, and thus it is desired that the dictionary be created using a computer.

The following patent literatures and non patent literatures will be described below as they relate to the present invention:

[PTL 1] Japanese Unexamined Patent Application Publication No. 2005-235014.
[NPL 1] Sakai, Umemura, Masuyama, "Kootsuu-jiko-rei ni fukumareru jiko-gen'in-hyoogen no shimbun-kiji kara no chuushutsu (Extraction of Expressions concerning Accident Cause contained in Articles on Traffic Accidents)", Shizen-gengo-shori (Journal of natural language processing) Vol. 13, No. 2, April 2006.
[NPL 2] S. D. Saeger, K. Torisawa, J. Kazama, "Looking for Trouble", Proceedings of the 22nd International Conference on Computational Linguistics (Coling2008), pages 185-192, Manchester, August 2008.
[NPL 3] Kakimoto, Yamamoto, "Koobun-hen o mochiita nippoo kara no shoogai-joohoo chuushutsu (Extraction of trouble information from daily reports by using syntactic pieces)", Gengo-shori-gakkai (The Association for Natural Language Processing), Dai 14-kai nenji taikai, Happyoo-rombun-shuu (In Proceedings of the 14th Annual Meeting of The Association of Natural Language Processing), March 2008.
[NPL 4] Kurita Mitsuharu, and three others, "Web-fooramu no koobun-joohoo o mochiita toraburu-shuuto bunsho chuushutsu (Troubleshoot Document Extraction Using Sentence Structures of Web Forums)", Joohoo-shori-gakkai (Information Processing Society of Japan), Zenkoku taikai kooen-rombun-shuu, Dai 70-kai (In Proceedings of the 70th IPSJ National Convention), March 2008.

Patent Literature 1 discloses a technique for automatically creating a dictionary used in mining. Patent Literature 1 discloses an expression extraction device extracting evaluation expressions from text in which the evaluation of a specific object to be evaluated is described. Each of the evaluation expressions indicates the evaluation of the object to be evaluated. The expression extraction device includes a registered expression storage unit that registers, as a registered expression, an evaluation expression for which the polarity is predetermined. The positive polarity represents a positive evaluation and the negative polarity represents a negative evaluation. It also includes an expression extraction unit for extracting a plurality of evaluation expressions and a conjunctive expression from the text, the conjunctive expression indicating the conjunctive relationship between the evaluation expressions. It also includes a registered expression detection unit for detecting the evaluation expression including the registered expression registered in the registered expression storage unit, out of the plurality of evaluation expressions. It also includes a polarity determination unit for determining that the evaluation expression has the same polarity as the registered expression.

Moreover, techniques for extracting expressions related to defects include those described in Non Patent Literatures 1 to 4. Non Patent Literature 1 discloses a method for acquiring accident cause expressions and the seed expressions by: repeating the process for defining expressions each of which is modified by expressions representing accident causes as seed expressions; manually giving a seed expression to automatically acquire accident cause expressions modifying the seed expression; automatically acquiring seed expressions from the acquired accident cause expressions; and further acquiring accident cause expressions from the acquired seed expressions.

Non Patent Literature 2 discloses a method for collecting expressions generally likely to be related to troubles by supervised learning. More specifically, Non Patent Literature 2 discloses a technique for collecting expressions generally likely to be related to troubles using, as positive evidence: (1) structural pattern information on hyponyms of "trouble" (lexico-syntactic patterns for hyponymy relations) and (2) dependency relations between negated verbs and objects (dependency relations between expressions and negated verbs) and using, as negative evidence, (3) dependency relations between non-negated verbs and objects (dependency relations between expressions and non-negated verbs).

Non Patent Literature 3 discloses, as a method for expanding a trouble information dictionary: searching a syntactic piece list for a preceding section of trouble information to be expanded; acquiring top-ten frequent subsequent sections taken by the preceding section as a high-ranking subsequent section list; searching the syntactic piece list using the ten subsequent sections in the high-ranking subsequent section list; acquiring top-ten frequent preceding sections taken by the subsequent sections as a high-ranking preceding section list; connecting subsequent sections subjected to expansion to the preceding sections in the high-ranking list; and then adding the results to the trouble information dictionary.

Non Patent Literature 4 discloses a technique for extracting, from known troubleshoot documents, constructions that frequently occur in the text; more specifically, a technique for extracting constructions that frequently occur in known troubleshoot documents by converting sentences included in the troubleshoot documents to undirected graphs and acquiring a sub-graph common to the graphs.

However, the technique for automatically creating a dictionary disclosed in Patent Literature 1 covers evaluation expressions and uses tendencies in evaluation expressions, i.e., tendencies in which, in many cases, evaluation expressions successively occur, positive evaluation expressions come before and after a positive evaluation expression, and negative evaluation expressions come before and after a negative evaluation expression. Thus, the technique in Patent Literature 1 cannot be applied to expressions related to defects in which such tendencies are not observed.

Moreover, the method disclosed in Non Patent Literature 1 extracts accident cause expressions. Moreover, expressions likely to be related to troubles, which are extracted by the method disclosed in Non Patent Literature 2, are nouns. In general, such nouns represent, for example, entities in which defects have occurred as well as the causes of the defects. Thus, expressions representing defect phenomena occurring in products cannot be extracted by the methods disclosed in Non Patent Literatures 1 and 2.

Moreover, a syntactic piece acquired by the method disclosed in Non Patent Literature 3 as trouble information represents a dependency relation or a series of phrases. Moreover, constructions that frequently occur in troubleshoot documents are acquired by the method disclosed in Non Patent Literature 4. In defect detection techniques based on text mining, it is important to capture, for example, a deviation and a change in the distribution of extracted expressions, as described above. To this end, extracted expressions need to be sufficiently included with frequency in data to be analyzed. Since the frequency of occurrence of long objects to be extracted, such as syntactic pieces and constructions, is low, such long objects are inappropriate as expressions to be registered in a dictionary of expressions related to defects.

SUMMARY OF THE INVENTION

To overcome these deficiencies, the present invention provides a defect predicate expression extraction device extracting predicate expressions representing defects from text data related to use of products belonging to a specific product area, the defect predicate expression extraction device including: a predicate modifying expression storage unit for detecting defect expressions, wherein the predicate modifying expression storage unit stores at least one of predicate modifying expressions representing suddenness and predicate modifying expressions representing repeatability; a defect predicate expression candidate extraction unit for detecting, in the text data, expressions matching each of the predicate modifying expressions stored in the predicate modifying expression storage unit for detecting defect expressions, and extracting, as a candidate for a predicate expression representing a defect, a predicate expression occurring in a neighborhood of each of the detected expressions in the text data; a predicate modifying expression storage unit for detecting normality expressions, wherein the predicate modifying expression storage unit stores predicate modifying expressions representing normality; a normality predicate expression extraction unit for detecting, in the text data, expressions matching each of the predicate modifying expressions stored in the predicate modifying expression storage unit for detecting normality expressions, and extracting, as a predicate expression representing normality, a predicate expression occurring in a neighborhood of each of the detected expressions in the text data; and a defect predicate expression acquisition unit for acquiring, as the predicate expressions representing defects, predicate expressions remaining after the predicate expressions extracted by the normality predicate expression extraction unit are removed from a list of the predicate expressions extracted as candidates for the predicate expressions representing defects.

According to another aspect of the invention, the present invention provides A defect predicate expression extraction method for extracting predicate expressions representing defects from text data related to use of products belonging to a specific product area, the method including: storing in a first predicate modifying expression storage unit, as predicate modifying expressions for detecting defect expressions, at least one of predicate modifying expressions representing suddenness and predicate modifying expressions representing repeatability; detecting, in the text data, expressions matching each of the stored predicate modifying expressions for detecting defect expressions and extracting, as a candidate for a predicate expression representing a defect, a predicate expression occurring in a neighborhood of each of the detected expressions in the text data; storing in a second predicate modifying expression storage unit, as predicate modifying expressions for detecting normality expressions, predicate modifying expressions representing normality; detecting, in the text data, expressions matching each of the stored predicate modifying expressions for detecting normality expressions and extracting, as a predicate expression representing normality, a predicate expression occurring in a neighborhood of each of the detected expressions in the text data; and acquiring, as the predicate expressions representing defects, predicate expressions remaining after the extracted predicate expressions are removed from a list of the predicate expressions extracted as the candidates for the predicate expressions representing defects.

According to yet another aspect of the invention, the present invention provides A computer program product for extracting predicate expressions representing defects from text data related to use of products belonging to a specific product area, the computer program product including: a computer readable storage medium having computer readable program code embodied therewith, the computer readable program code including: computer readable program code configured to perform the steps of: storing in a first predicate modifying expression storage module, as predicate modifying expressions for detecting defect expressions, at least one of predicate modifying expressions representing suddenness and predicate modifying expressions representing repeatability; detecting, in the text data, expressions matching each of the stored predicate modifying expressions for detecting defect expressions and extracting, as a candidate for a predicate expression representing a defect, a predicate expression occurring in a neighborhood of each of the detected expressions in the text data; storing in a second predicate modifying expression storage module, as predicate modifying expressions for detecting normality expressions, predicate modifying expressions representing normality; detecting, in the text data, expressions matching each of the stored predicate modifying expressions for detecting normality expressions and extracting, as a predicate expression representing normality, a predicate expression occurring in a neighborhood of each of the detected expressions in the text data; and acquiring, as the predicate expressions representing defects, predicate expressions remaining after the extracted predicate expressions are removed from a list of the predicate expressions extracted as the candidates for the predicate expressions representing defects.

According to the present invention, predicate expressions that can briefly describe defect phenomena, out of expressions related to defects, can be automatically extracted by computer processing. Moreover, according to the present invention, since predicate expressions representing defects are acquired using information common to all product areas, such as predicate modifying expressions representing suddenness, predicate modifying expressions representing repeatability, and predicate modifying expressions representing normality, predicate expressions representing defects can be extracted in a way common to all product areas, not specific to a specific product area. The other advantageous effects of the present invention will be appreciated from the description of an embodiment.

BRIEF DESCRIPTION OF THE SEVERAL VIEWS OF THE DRAWINGS

FIG. 2 shows exemplary sentences to be processed by the defect predicate expression extraction device 100 according to a embodiment of the present invention.

FIG. 3 is a diagram showing an exemplary operational flow of the defect predicate expression extraction device 100 according to an embodiment of the present invention.

FIG. 4 is an exemplary table in which the respective accuracies of extracted defect predicate expressions in a known method and the present invention are compared.

FIGS. 5A and 5B are tables showing an exemplary result of analysis of defect document data acquired using a dictionary in which defect predicate expressions extracted by the known method are registered.

FIGS. 6A and 6B are tables showing an exemplary result of analysis of defect document data acquired using a dictionary in which defect predicate expressions extracted according to the present invention are registered.

FIG. 7 is a diagram showing exemplary hardware components of an information processor suitable for implementing the defect predicate expression extraction device 100 according to an embodiment of the present invention.

DETAILED DESCRIPTION OF THE PREFERRED EMBODIMENTS

Figure 1:
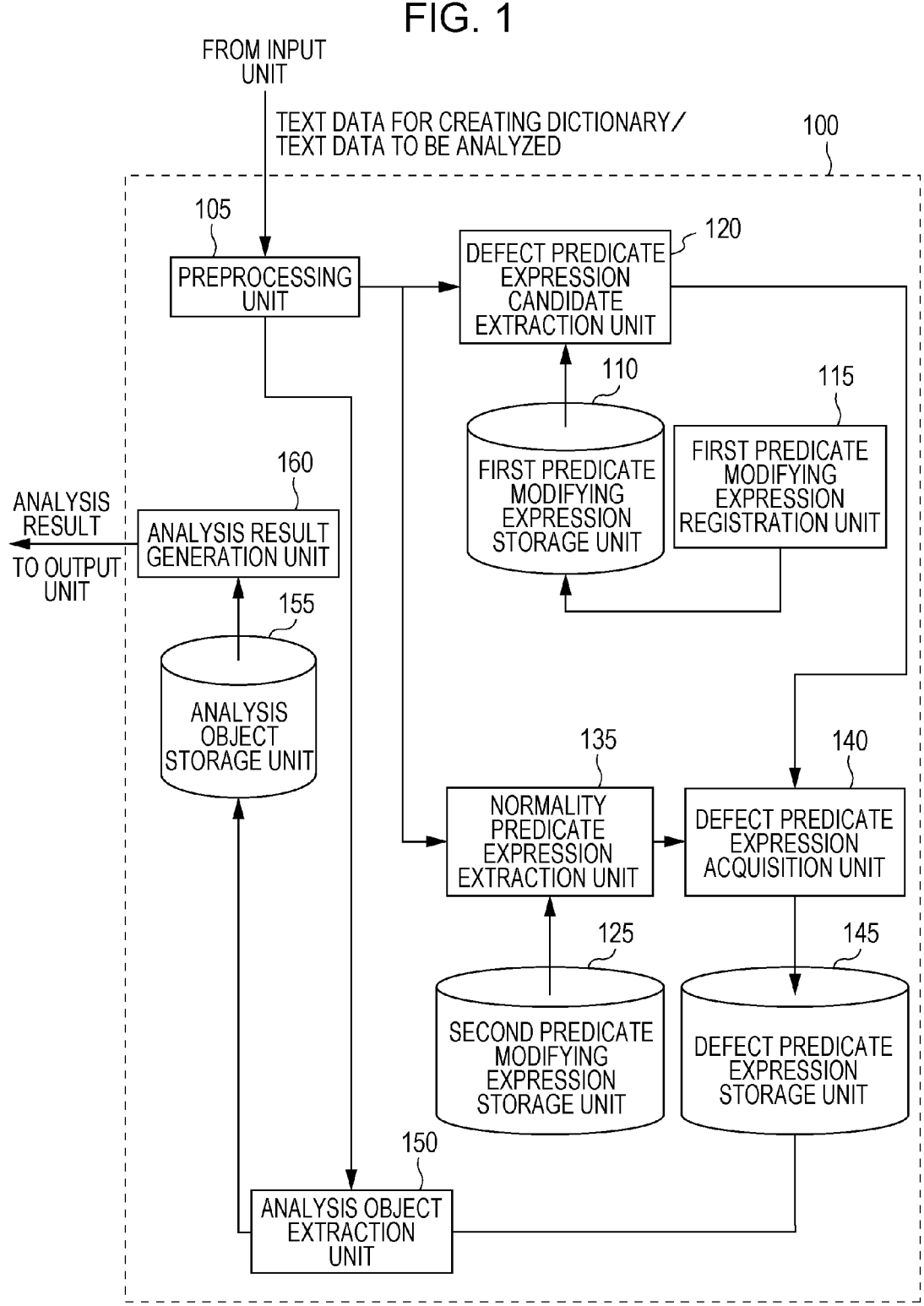
FIG. 1 shows exemplary functional components of a defect predicate expression extraction device 100 according to an embodiment of the present invention.

An embodiment for carrying out the present invention will now be described in detail on the basis of the drawings. However, the following embodiment does not restrict the invention claimed in the claims. Moreover, all combinations of features described in the embodiment are not necessarily mandatory for the problem-solving means of the invention. The same numbers are assigned to the same components throughout the description of the embodiment.

FIG. 1 shows exemplary functional components of a defect predicate expression extraction device 100 according to an embodiment of the present invention. The defect predicate expression extraction device 100 acquires, as text data for creating a dictionary, data related to use of products belonging to a specific product area, such as report data from users collected on the Web. For example, this can include bulletin boards and consumer complaint sites, and inquiry data in a customer support center. When data is acquired in the form of voices, the data is converted to text data by speech recognition in advance. The defect predicate expression extraction device 100 extracts predicate expressions representing defects, out of expressions related to defects of products, from text data for creating a dictionary. The reason why predicate expressions are extracted is that predicate expressions can briefly describe defect phenomena.

In the data of user voices about use of products, in many cases, regardless of the product area, predicate expressions representing defects occur in a state in which the predicate expressions are modified by, for example, predicate modifying expressions representing suddenness (for example, "unexpectedly", "suddenly", and "sharply") and predicate modifying expressions representing repeatability (for example, "often", "sometimes", and "frequently"). On the other hand, predicate expressions representing defects do not occur in a state in which the predicate expressions are modified by predicate modifying expressions representing normality (for example, "securely", "firmly", and "properly"). Thus, the defect predicate expression extraction device 100 according to an embodiment of the present invention extracts, as candidates for predicate expressions representing defects, predicate expressions in the neighborhood of predicate modifying expressions representing suddenness or predicate modifying expressions representing repeatability, using these tendencies. Furthermore, the defect predicate expression extraction device 100 extracts, as predicate expressions representing normality, predicate expressions in the neighborhood of predicate modifying expressions representing normality. Furthermore, the defect predicate expression extraction device 100 extracts predicate expressions representing defects by removing the predicate expressions representing normality, as noise, from the candidates for predicate expressions representing defects.

The defect predicate expression extraction device 100 in FIG. 1 according to an embodiment of the present invention includes: a preprocessing unit 105; a first predicate modifying expression storage unit (corresponding to a predicate modifying expression storage unit for detecting defect expressions in the claims) 110; a first predicate modifying expression registration unit (corresponding to a predicate modifying expression registration unit for detecting defect expressions in the claims) 115; a defect predicate expression candidate extraction unit 120; a second predicate modifying expression storage unit (corresponding to a predicate modifying expression storage unit for detecting normality expressions in the claims) 125; a normality predicate expression extraction unit 135; a defect predicate expression acquisition unit 140; a defect predicate expression storage unit 145; an analysis object extraction unit 150; an analysis object storage unit 155; and an analysis result generation unit 160. The description will be given, assuming that the text data for creating a dictionary, the text data to be analyzed, and the like to be input to the defect predicate expression extraction device 100 are data in Japanese. However, it should be noted that when the input data is data in another language such as English, the respective functions of the components do not vary.

The preprocessing unit 105 performs, as preprocessing, a morphological analysis and a dependency analysis on text data for creating a dictionary and text data to be analyzed to be input to the defect predicate expression extraction device 100. A morphological analysis is processing in which the text of input data is divided into words, each of which is a smallest unit (morpheme) carrying meaning as language, and attributes of each of the words, including the part of speech, are added. Methods for the processing include, for example, the longest match method, the minimum cost method, and the example search method. Moreover, a dependency analysis is processing in which dependency relations between bunsetsu (a phrase representing a smallest coherent component in a Japanese sentence) are acquired. Since a morphological analysis and a dependency analysis are known techniques (for example, refer to "Gengo-shori-gaku jiten" (Encyclopedia of Natural Language Processing), Gengo-shori-gakkai (The Association for Natural Language Processing) hen, Kyooritsu-shuppan-sha, December 2009), and corresponding tools are available for pay or free, the detailed description of the technique is omitted here.

The first predicate modifying expression storage unit 110 stores predicate modifying expressions representing suddenness and/or predicate modifying expressions representing repeatability. In this case, predicate modifying expressions represent expressions identified as predicate modifiers and include an adverb and a predicate modifying clause. The word "suddenness" represents a property of suddenly occurring undesirably. Thus, predicate modifying expressions representing suddenness include, for example, "totsuzen" (unexpectedly), "kyuu-ni" (sharply), "ikinari" (suddenly), "totsujo" (suddenly), "totsujo-to-shite" (suddenly), "totsuzen-ni" (suddenly), "fui-ni" (unexpectedly), "toototsu" (abruptly), "tachimachi" (instantly), "dashi-nuke" (unexpectedly), "tossa" (instantly), "gazen" (suddenly), "kotsuzen" (suddenly), and "hatato" (suddenly). Moreover, the word "repeatability" represents a property of occurring repeatedly. Thus, predicate modifying expressions representing repeatability include, for example, "tabitabi" (often), "tokidoki" (sometimes), "himpanni" (frequently), "nandomo" (many times), "saisan" (repeatedly), and "shikirini" (constantly). Predicate modifying expressions that are determined, in advance, as being predicate modifying expressions representing suddenness or predicate modifying expressions representing repeatability are manually registered in the first predicate modifying expression storage unit 110 in advance.

In this case, predicate modifying expressions representing repeatability include ones including an expression part S, such as "for each S (for example, use)" and "for each S (for example, activation)", and ones including numbers M and N, such as "less than every M (for example, one) days", "N (for example, one) times every M (for example, two) times", and "N (for example, one) times every M (for example, one) hours". Regarding a predicate modifying expression including an expression part in this manner, only the remaining part other than the expression part or pattern information, for example, "(number)+(times, hour, minute, second, day, week, month, or year)+(number)+(times)", may be registered in the first predicate modifying expression storage unit 110.

The first predicate modifying expression registration unit 115 extracts, from text data related to use of products, predicate modifying expressions co-occurring with a predicate expression representing a specific defect and registers the predicate modifying expressions in the first predicate modifying expression storage unit 110 as predicate modifying expressions for detecting defect expressions. In this case, a predicate expression representing a specific defect is determined as being a predicate expression representing a defect in advance, for example, "koshoo-suru" (fail). Moreover, when it is determined whether a predicate modifying expression co-occurs with a predicate expression representing a specific defect, the values of, for example, pointwise mutual information, a Z score, and a log-likelihood ratio can be used. In this case, text data from which predicate modifying expressions for detecting defect expressions are extracted can be the aforementioned text data for creating a dictionary or other text data in which the defects of products belonging to the same or different product area are described.

The defect predicate expression candidate extraction unit 120 detects, in the text data for creating a dictionary, expressions matching each of the predicate modifying expressions stored in the first predicate modifying expression storage unit 110 and extracts, as a candidate for a predicate expression representing a defect, a predicate expression occurring in the neighborhood of each of the detected expressions in the text data for creating a dictionary. In this, whether a match exists can be determined by checking whether the respective stems of corresponding words match each other. Alternatively, all the respective conjugation patterns of predicate modifying expressions can be prepared and registered in the first predicate modifying expression storage unit 110 in advance, and whether a match exists can be determined by checking whether an exact match to each of the patterns exists. Then, the defect predicate expression candidate extraction unit 120 transfers the extracted predicate expression to the defect predicate expression acquisition unit 140 described below after converting the predicate expression to its basic form. In this case, whether a predicate expression occurs in the neighborhood of a detected predicate modifying expression can be determined by determining whether the predicate expression occurs within a predetermined number of words (for example, within five words or adjacent to, in the same sentence) from the detected predicate modifying expression, and the part of speech of the predicate expression is a verb.

For example, it is assumed that "ikinari" (suddenly) is stored in the first predicate modifying expression storage unit 110 as a predicate modifying expression representing suddenness. Moreover, it is assumed that the neighborhood is defined as "within five words". In the case of a sentence 1 shown in FIG. 2, a predicate modifying expression 205, "ikinari" (suddenly), is detected, and a verb 210, "kowareta" (was broken), existing in the neighborhood of the predicate modifying expression 205, i.e., within five words from the predicate modifying expression 205, is extracted as a candidate for a predicate expression representing a defect. In this case, it is assumed that, when a plurality of verbs that meet the aforementioned conditions exist, only a verb existing at a position closest to a detected predicate modifying expression is extracted.

Alternatively, the defect predicate expression candidate extraction unit 120 may detect, in the text data for creating a dictionary, expressions matching each of the predicate modifying expressions stored in the first predicate modifying expression storage unit 110 and extract, as a candidate for a predicate expression representing a defect, a predicate expression directly modified by each of the detected expressions in the text data for creating a dictionary by acquiring the predicate expression from a dependency relation. This case will be described, again taking the sentence 1 shown in FIG. 2 as an example. When "ikinari" (suddenly) is stored in the first predicate modifying expression storage unit 110 as a predicate modifying expression representing suddenness, in the case of the sentence 1, the predicate modifying expression 205, "ikinari" (suddenly), is detected, and the verb 210, "kowareta" (was broken), directly modified by the predicate modifying expression 205 is extracted as a candidate for a predicate expression representing a defect.

Furthermore, regarding each predicate expression extracted as a candidate for a predicate expression representing a defect, the defect predicate expression candidate extraction unit 120 may count the number of occurrences of the predicate expression occurring in the neighborhood of at least one of the predicate modifying expressions stored in the first predicate modifying expression storage unit 110 in the text data for creating a dictionary and store the number of occurrences. The usage of the counted number of occurrences is described below.

The second predicate modifying expression storage unit 125 stores predicate modifying expressions representing normality. In this case, the word "normality" represents an intended normal property. Thus, predicate modifying expressions representing normality include, for example, "kichinto" (securely), "shikkari" (firmly), "tadashiku" (properly), "futsuu-ni" (normally), "seikaku-ni" (correctly), "ikkoo-ni" (at all), "zenzen" (at all), "hotondo" (almost), "seijoo-ni" (normally), "kicchiri-to" (exactly), "chanto" (properly), "choodo" (just), "seizen-to" (orderly), "kikkari" (exactly), "kikkari-to" (exactly), and "kacchiri" (exactly). Predicate modifying expressions that are determined, in advance, as being predicate modifying expressions representing normality are manually registered in the second predicate modifying expression storage unit 125 in advance.

The normality predicate expression extraction unit 135 detects, in the text data for creating a dictionary, expressions matching each of the predicate modifying expressions stored in the second predicate modifying expression storage unit 125 and extracts, as a predicate expression representing normality, a predicate expression occurring in the neighborhood of each of the detected expressions in the text data for creating a dictionary. In this, whether a match exists can be determined by checking whether the respective stems of corresponding words match each other. Alternatively, all the respective conjugation patterns of predicate modifying expressions can be prepared and registered in the second predicate modifying expression storage unit 125 in advance, and whether a match exists can be determined by checking whether an exact match to each of the patterns exists. Then, the normality predicate expression extraction unit 135 transfers the extracted predicate expression to the defect predicate expression acquisition unit 140 described below after converting the predicate expression to its basic form. In this case, whether a predicate expression occurs in the neighborhood of a detected predicate modifying expression can be determined by determining whether the predicate expression occurs within a predetermined number of words (for example, within five words or adjacent to, in the same sentence) from the detected predicate modifying expression, and the part of speech of the predicate expression is a verb. In this case, it is assumed that, when a plurality of verbs that meet the conditions exist, only a verb existing at a position closest to a detected predicate modifying expression is extracted.

Alternatively, the normality predicate expression extraction unit 135 may detect, in the text data for creating a dictionary, expressions matching each of the predicate modifying expressions stored in the second predicate modifying expression storage unit 125 and extract, as a predicate expression representing normality, a predicate expression directly modified by each of the detected predicate modifying expressions by acquiring the predicate expression from a dependency relation. Furthermore, regarding each predicate expression extracted as a predicate expression representing normality, the normality predicate expression extraction unit 135 may count the number of occurrences of the predicate expression occurring in the neighborhood of at least one of the predicate modifying expressions stored in the second predicate modifying expression storage unit 125 in the text data for creating a dictionary and store the number of occurrences. The usage of the counted number of occurrences is described below.

The defect predicate expression acquisition unit 140 acquires, as predicate expressions representing defects, predicate expressions remaining after the predicate expressions extracted by the normality predicate expression extraction unit 135 are removed from a list of the predicate expressions extracted as candidates for predicate expressions representing defects. Alternatively, the same predicate expression can be extracted by both the defect predicate expression candidate extraction unit 120 and the normality predicate expression extraction unit 135. The defect predicate expression acquisition unit 140 may determine, on the basis of the respective numbers of occurrences of the predicate expression counted by the defect predicate expression candidate extraction unit 120 and the normality predicate expression extraction unit 135, whether to set the predicate expression extracted by both the defect predicate expression candidate extraction unit 120 and the normality predicate expression extraction unit 135 to be a predicate expression representing a defect.

Specifically, if the number of occurrences counted by the defect predicate expression candidate extraction unit 120 is larger than the number of occurrences counted by the normality predicate expression extraction unit 135, then the defect predicate expression acquisition unit 140 acquires, as a predicate expression representing a defect, a predicate expression extracted by both the defect predicate expression candidate extraction unit 120 and the normality predicate expression extraction unit 135. In this case, the defect predicate expression acquisition unit 140 also acquires, as predicate expressions representing defects, all the predicate expressions extracted only by the defect predicate expression candidate extraction unit 120. The defect predicate expression acquisition unit 140 stores the acquired predicate expressions representing defects in the defect predicate expression storage unit 145.

The defect predicate expression storage unit 145, in which the predicate expressions representing defects are registered in this manner, can be used as a dictionary of predicate expressions representing defects in text mining for detecting defects. In this case, predicate expressions representing defects vary with the product area, and when defects related to a specific product area need to be detected, data related to use of products belonging to the specific product area is input to the defect predicate expression extraction device 100 as the text data for creating a dictionary. On the other hand, predicate modifying expressions to be stored in the first predicate modifying expression storage unit 110 and the second predicate modifying expression storage unit 125 do not depend on a specific product area and thus can be used as data common to all product areas.

The analysis object extraction unit 150 detects, in the text data to be analyzed related to use of products, expressions matching each of the predicate expressions representing defects stored in the defect predicate expression storage unit 145 and extracts a noun expression occurring in the neighborhood of each of the detected predicate expressions in the text data to be analyzed. In this case, each of the text data to be analyzed and the text data for creating a dictionary used to extract the predicate expressions representing defects stored in the defect predicate expression storage unit 145 is text data related to use of products belonging to the same product area. Moreover, in an embodiment, since each of the predicate expressions representing defects stored in the defect predicate expression storage unit 145 is a verb in the basic form, whether a match exists can be determined by checking whether the respective stems of corresponding words match each other, the stems being recognized by the basic language processing such as a morphological analysis. Alternatively, all the respective conjugation patterns of verbs that are predicate expressions can be registered in the defect predicate expression storage unit 145 in advance, and whether a match exists can be determined by checking whether an exact match to each of the patterns exists. The analysis object extraction unit 150 further stores, as an object to be analyzed, a pair of each of the detected predicate expressions and a corresponding one of the extracted noun expressions, together with the frequency of extraction, in the analysis object storage unit 155.

In this case, whether a noun expression occurs in the neighborhood of a detected predicate expression can be determined by determining whether the noun expression occurs within a predetermined number of words (for example, within two words or adjacent to, in the same sentence) from the detected predicate expression. For example, it is assumed that "wareru" (be broken) is stored in the defect predicate expression storage unit 145 as a predicate expression representing a defect. Moreover, it is assumed that the neighborhood is defined as "within two words." In the case of a sentence 2 shown in FIG. 2, a predicate expression 220, "wareta" (was broken), is detected, and a noun 215, "mado-garasu" (window), existing in the neighborhood of the predicate expression 220, i.e., within two words from the predicate expression 220, is extracted as an object to be analyzed.

In the aforementioned case, for example, when the neighborhood is defined as "within three words," in addition to "mado-garasu," (window) "koobu-zaseki" (rear seat) in the neighborhood of the predicate expression 220 is extracted. In this way, a plurality of nouns can be extracted in a manner that depends on the definition of "neighborhood." Such a case is handled by, for example, a method for extracting the nominative case, a method for extracting a noun followed by a nominative marker in Japanese, "go" or "ha," a method for extracting an expression closer to a detected predicate expression in distance, or a method for extracting all the nouns. Which of the methods is selected depends on, for example, what is considered to be important (for example, accuracy or exhaustiveness) or the type of information that can be used as the result of a syntax analysis.

Alternatively, the neighborhood of a detected predicate expression can be defined as the nominative case of the detected predicate expression. That is, the analysis object extraction unit 150 may detect, in the text data to be analyzed, expressions matching each of the predicate expressions stored in the defect predicate expression storage unit 145, extract the nominative case of each of the detected predicate expressions, and set the extracted nominative case to be a noun expression occurring in the neighborhood of the detected predicate expression.

The analysis result generation unit 160 calculates the correlation value of each object to be analyzed stored in the analysis object storage unit 155, e.g., a pair of a noun expression A and a predicate expression B, and generates the correlation value of the object to be analyzed as an analysis result. The correlation value between A and B to be analyzed is calculated by the following equation:

$$\left(\frac{\#(A \cap B)/\# A}{\# B/\# D}\right) = \left(\frac{\#(A \cap B)/\# D}{(\# A/\# D)(\# B/\# D)}\right) \quad [\text{E1}]$$

where D represents all pieces of data, and # represents the number of pieces of data. That is, $\#(A \cap B)$ represents the number of pieces of data including both A and B, and #D represents the total number of all the pieces of data. When $\#(A \cap B)$ in the foregoing equation is small, the reliability of the correlation value decreases. An unreliable value can be corrected to a small value using interval estimation so as to prevent a case where the efficiency, accuracy, and the like of analysis work decreases because a high correlation value calculated though the correlation value is unreliable. In interval estimation, a minimum $\alpha$ that can achieve the current correlation value, except by chance of a predetermined probability or less, assuming that a true correlation value $\alpha$ in a case where an infinite number of documents exist is an unknown, is calculated. An analysis result generated by the analysis result generation unit 160 can be output to an output unit such as a printer or a display.

Referring to FIG. 3, the operational flow of the defect predicate expression extraction device 100 according to an embodiment of the present invention will now be described. The operational flow shown in FIG. 3 is started from step 305 where the preprocessing unit 105 receives data related to use of products belonging to a specific product area as text data for creating a dictionary and performs a morphological analysis and a dependency analysis on the text data. The results of the morphological analysis and the dependency analysis are stored in a storage unit (not shown) so as to be available for a process described below.

Then, in step 310, the defect predicate expression candidate extraction unit 120 reads a predicate modifying expression representing suddenness or a predicate modifying expression representing repeatability stored in the first predicate modifying expression storage unit 110 and detects expressions matching the read predicate modifying expression by scanning the text data for creating a dictionary. Upon detecting expressions matching the read predicate modifying expression, the defect predicate expression candidate extraction unit 120 extracts a predicate expression in the neighborhood of each of the detected expressions as a candidate for a predicate expression representing a defect, referring to the results of the morphological analysis and the dependency analysis.

Whether a predicate expression exists in the neighborhood of the detected expression can be determined according to a predetermined definition of the range of the neighborhood (for example, within a predetermined number of words from a predicate modifying expression). Alternatively, the operation can be performed considering an expression directly modified by the detected predicate modifying expression to be a predicate expression in the neighborhood of the detected predicate modifying expression. The defect predicate expression candidate extraction unit 120 performs such an operation on all the predicate modifying expressions stored in the first predicate modifying expression storage unit 110.

Then, the normality predicate expression extraction unit 135 reads a predicate modifying expression representing normality stored in the second predicate modifying expression storage unit 125 and detects expressions matching the read predicate modifying expression by scanning the text data for creating a dictionary. Upon detecting expressions matching the read predicate modifying expression, the normality predicate expression extraction unit 135 extracts a predicate expression in the neighborhood of each of the detected expressions as a predicate expression representing normality, referring to the results of the morphological analysis and the dependency analysis (step 315). Whether a predicate expression exists in the neighborhood of the detected expression can be determined in a way similar to that described regarding step 310. The normality predicate expression extraction unit 135 performs such an operation on all the predicate modifying expressions stored in the second predicate modifying expression storage unit 125.

Each of the predicate expressions extracted by the defect predicate expression candidate extraction unit 120 and the normality predicate expression extraction unit 135 is transferred to the defect predicate expression acquisition unit 140 after being converted to its basic form. Moreover, when each of the defect predicate expression candidate extraction unit 120 and the normality predicate expression extraction unit 135 counts the frequency of extraction of each extracted predicate expression, as described above, the frequency of extraction, together with the extracted predicate expression, is also transferred to the defect predicate expression acquisition unit 140. In an example, it is assumed that, in the text data for creating a dictionary, a predicate expression, "koshoo-suru" (fail), has occurred five times in the neighborhood of a predicate modifying expression representing suddenness, "ikinari" (suddenly), and twice in the neighborhood of a predicate modifying expression representing repeatability, "tabitabi" (often). In this case, the defect predicate expression candidate extraction unit 120 transfers the frequency of extraction, seven times (=5+2), together with the predicate expression, "koshoo-suru" (fail), to the defect predicate expression acquisition unit 140. The same applies to a predicate expression representing normality.

Then, the defect predicate expression acquisition unit 140 acquires, as predicate expressions representing defects, predicate expressions remaining after the predicate expressions extracted by the normality predicate expression extraction unit 135 are removed from a list of the predicate expressions extracted as candidates for predicate expressions representing defects (step 320). When the defect predicate expression acquisition unit 140 receives the frequency of extraction, together with each extracted predicate expression, the defect predicate expression acquisition unit 140 acquires predicate expressions representing defects in the following way:

The defect predicate expression acquisition unit 140 acquires, as predicate expressions representing defects, all the predicate expressions extracted only by the defect predicate expression candidate extraction unit 120. On the other hand, regarding a predicate expression extracted by both the defect predicate expression candidate extraction unit 120 and the normality predicate expression extraction unit 135, on the condition that the number of occurrences counted by the defect predicate expression candidate extraction unit 120 is larger than the number of occurrences counted by the normality predicate expression extraction unit 135, the defect predicate expression acquisition unit 140 acquires the aforementioned predicate expression as a predicate expression representing a defect. The defect predicate expression acquisition unit 140 stores the acquired predicate expressions representing defects in the defect predicate expression storage unit 145.

After the predicate expressions representing defects are stored in the defect predicate expression storage unit 145, and a dictionary of predicate expressions representing defects is completed, the analysis object extraction unit 150 reads one of the predicate expressions representing defects stored in the defect predicate expression storage unit 145 and then detects expressions matching the read predicate expression by scanning text data to be analyzed. Upon detecting predicate expressions matching the read predicate expression, the analysis object extraction unit 150 extracts a noun expression in the neighborhood of each of the detected predicate expressions, referring to the results of a morphological analysis and a dependency analysis performed on the text data to be analyzed (step 325). The extracted noun expression and the detected predicate expression as an object to be analyzed, together with the frequency of extraction of the object to be analyzed, are stored in the analysis object storage unit 155.

In this case, the text data to be analyzed by the analysis object extraction unit 150 is related to use of one or more products included in the same product area as a product area related to the text data for creating a dictionary. Moreover, it is assumed that preprocessing of the text data to be analyzed is performed by the preprocessing unit 105 before the operation in step 325. Moreover, in step 325, whether a noun expression exists in the neighborhood of the detected predicate expression can be determined according to a predetermined definition of the range of the neighborhood (for example, within a predetermined number of words from a predicate expression). Alternatively, the operation can be performed considering an expression that is the nominative case of the detected predicate expression to be a noun expression in the neighborhood of the detected predicate expression. The analysis object extraction unit 150 performs such an operation on all the predicate expressions stored in the defect predicate expression storage unit 145.

Then, the analysis result generation unit 160 calculates the correlation value of each object to be analyzed stored in the analysis object storage unit 155 and outputs, for the object to be analyzed, the correlation value and the frequency of extraction as an analysis result (step 330). Then, the process is completed. What product or what part involves a defect or what factor has caused a defect can be investigated by acquiring, as an object to be analyzed, a pair of a predicate expression representing a defect and a noun expression serving as the nominative case of the predicate expression in this manner. Moreover, a defect specific to a specific product or a specific part or a factor likely to cause a defect can be determined by acquiring the correlation value of each object to be analyzed.

Referring to experimental results shown in FIG. 4, the effectiveness of the present invention will next be described. FIG. 4 shows a table in which the respective accuracies of extracted defect predicate expressions in a known method and the present invention are compared. In the experimental results shown in FIG. 4, the following four types of text data are used as text data for creating a dictionary: sets of data of inquiries to a PC help center in Japanese and English and sets of car defect information in Japanese and English collected from car users. For each of the four types of text data, predicate expressions representing defects are extracted using the known method and the present embodiment of the invention.

The known method in this experiment is one for acquiring the respective frequencies of occurrence of verbs included in text data for creating a dictionary and extracting top most frequent verbs as predicate verbs representing defects. Regarding the present invention: accuracies achieved prior to noise processing, i.e., in a case where all candidates for defect predicate expressions extracted by the aforementioned defect predicate expression candidate extraction unit 120 are set to be defect predicate expressions; and accuracies achieved posterior to noise processing, i.e., in a case where candidates for defect predicate expressions from which predicate expressions representing normality have been removed are set to be defect predicate expressions, are acquired. In this case, it should be noted that the method according to the present invention for extracting defect predicate expressions does not depend on the language of data.

In the table shown in FIG. 4, the leftmost column shows the type of used text data for creating a dictionary, and the uppermost row shows the used method for extracting defect predicate expressions. Moreover, in the table, the equation in a column "number of defect predicate expressions" shows (the number of predicate expressions determined as being predicate expressions actually representing defects)/(the number of extracted predicate expressions representing defects), and the number in a column "accuracy" shows a value acquired from the corresponding equation registered in the column "number of defect predicate expressions." Thus, an equation 64/2000 and a value of 3.2% as a result of the experiment by the known method for the set of data of inquiries to a PC help center in Japanese show that, out of top-2000 frequent verbs, 64 verbs are determined as being predicate expressions actually representing defects, and the accuracy is 3.2% (=64/2000).

The result of the experiment according to the present invention (prior to noise processing) on the same data shows that 385 predicate expressions representing defects are extracted, 28 predicate expressions, out of the predicate expressions, are determined as being predicate expressions actually representing defects, and the accuracy is 7.3%. In order to search for predicate expressions actually representing defects, in the known method, 2000 verbs need to be covered. On the other hand, in the present invention (prior to noise processing), only 385 verbs need to be covered. Thus, from the viewpoint of the cost of operations, it can be said that, in the present invention (prior to noise processing), the cost is reduced from that in the known method by 81%. The number in parentheses in the column "number of defect predicate expressions" shows the percentage of reduction in the cost from that in the known method. The number in parentheses in the column "accuracy" shows that the accuracy increases from the accuracy of 3.2% in the known method by 4.1 percentage points.

Moreover, the result of the experiment according to this embodiment of the present invention (posterior to noise processing) on the same data shows that 92 predicate expressions representing defects are extracted, and 21 predicate expressions out of the predicate expressions are determined as being predicate expressions actually representing defects. In this case, the accuracy increases from that in the known method by 15.5 percentage points, and the cost of operations is reduced from that in the known method by 95%. Similar tendencies are observed in the experimental results regarding the other three types of data. Thus, in the present invention, regardless of noise processing, the cost of extracting defect predicates can be reduced from that in the known method, and the accuracy can be increased from that in the known method. The effect can be further improved by performing noise processing.

Referring to FIGS. 5A, 5B, 6A, and 6B, the effectiveness of the present invention will next be described from another viewpoint. FIGS. 5A and 5B are a table showing an exemplary result of analysis of defect document data acquired using a dictionary in which defect predicate expressions extracted by the known method are registered. The known method in the experiment is one for acquiring the respective frequencies of occurrence of verbs included in text data related to defects of cars for creating a dictionary and manually extracting predicate verbs representing defects from the top most frequent verbs. FIGS. 6A and 6B are a table showing an exemplary result of analysis of defect document data acquired using a dictionary in which defect predicate expressions extracted according to the present invention (involving noise processing) are registered. In the analysis result shown in FIGS. 5A and 5B and the analysis result shown in FIGS. 6A and 6B, the same car defect information (Japanese) of each car model collected from car users is used as data to be analyzed.

In the tables shown in FIGS. 5A, 5B, 6A, and 6B, the leftmost column shows the type of the model of each car and the number of times the name of the model occurs in the data to be analyzed, and the uppermost row shows each frequent predicate expression representing a defect included in the used dictionary and the number of times the predicate expression occurs in the data to be analyzed. In each cell in the table, the number represents the number of co-occurrences of a corresponding predicate expression with the name of a corresponding model, and the number in parentheses represents the correlation value. The correlation value is acquired according to equation 1 described above. In the experiment, interval estimation is used. In interval estimation, a minimum a that can achieve the current correlation value, except by chance of a predetermined probability or less, assuming that a true correlation value α in a case where an infinite number of documents exist is an unknown, is calculated, as described above. In the examples shown in FIGS. 5A, 5B, 6A, and 6B, the predetermined probability is set to 90%.

In an intuitive sense, the correlation value shows how many times the number of co-occurrences is as many as that in a case where there is assumed to be no deviation in the distribution. For example, the experimental result regarding ModelF shown in the table in FIGS. 5A and 5B shows that ModelF co-occurs with "kasoku-suru" (accelerate) 31 times, and the number of co-occurrences is 4.1 times as many as that for the other models. The experimental result shows a high probability that some defect occurs in ModelF when ModelF is accelerated. Thus, detection of data with a high correlation value results in early detection of defects.

In each of the tables in FIGS. 5A, 5B, 6A, and 6B, cells in which the correlation value is high (cells with a correlation value of 2.0 or more) are shaded. In the table shown in FIGS. 5A and 5B, one cell is shaded. On the other hand, in the table shown in FIGS. 6A and 6B, six cells are shaded. This shows that the dictionary created according to the present invention includes many defect predicate expressions more suitable for detecting defect phenomena (in the case of the table shown in FIGS. 6A and 6B, "hasshin-suru" (depart), "hensoku-suru" (change speed), "sagaru" (go down), "oobaahiito-suru" (overheat), "kyuuhasshin-suru" (start abruptly), and "suberu" (slip)). In this way, according to the present invention, defect predicate expressions suitable for detecting defect phenomena that are not manually extracted can be extracted.

FIG. 7 is a diagram showing exemplary hardware components of a computer 50 according to the embodiment. The computer 50 includes a main CPU (central processing unit) 1 and a main memory 4 connected to a bus 2. Hard disk units 13 and 30 and removable storages (external storage systems in which a recording medium can be changed) such as CD-ROM units 26 and 29, a flexible disk unit 20, an MO unit 28, and a DVD unit 31 are connected to the bus 2 via a flexible disk controller 19, an IDE controller 25, and an SCSI controller 27.

Storage media such as a flexible disk, an MO, a CD-ROM, and a DVD-ROM are inserted into the removable storages. The code of a computer program for carrying out the present invention by issuing instructions to the CPU 1 and the like, cooperating with an operating system, can be recorded in, for example, these storage media, the hard disk units 13 and 30, and a ROM 14. That is, a defect predicate expression extraction program that is installed in the computer 50 and causes the computer 50 to function as the defect predicate expression extraction device 100 can be recorded in the various types of storage units described above.

The defect predicate expression extraction program includes: a preprocessing module; a first predicate modifying expression storage module managing the first predicate modifying expression storage unit 110; a first predicate modifying expression registration module; a defect predicate expression candidate extraction module; a second predicate modifying expression storage module managing the second predicate modifying expression storage unit 125; a normality predicate expression extraction module; a defect predicate expression acquisition module; a defect predicate expression storage module managing the defect predicate expression storage unit 145; an analysis object extraction module; an analysis object storage module managing the analysis object storage unit 155; and an analysis result generation module. These modules causes the CPU 1 and the like to cause the computer 50 to function as: the preprocessing unit 105; the first predicate modifying expression storage unit (corresponding to the predicate modifying expression storage unit for detecting defect expressions in the claims 110; the first predicate modifying expression registration unit (corresponding to the predicate modifying expression registration unit for detecting defect expressions in the claims 115; the defect predicate expression candidate extraction unit 120; the second predicate modifying expression storage unit (corresponding to the predicate modifying expression storage unit for detecting normality expressions in the claims 125; the normality predicate expression extraction unit 135; the defect predicate expression acquisition unit 140; the defect predicate expression storage unit 145; the analysis object extraction unit 150; the analysis object storage unit 155; and the analysis result generation unit 160. The computer program can be compressed and divided into a plurality of pieces to be recorded in a plurality of media.

The computer 50 receives input from input devices such as a keyboard 6 and a mouse 7 via a keyboard-mouse controller 5. The computer 50 receives input from a microphone 24 and outputs sounds from a speaker 23 via an audio controller 21 through an amplifier 22. The computer 50 is connected to a display unit 11 for presenting visual data to users via a graphics controller 8 connected to a VRAM 9. The display unit can be a CRT 12 or other device. It is connected to the graphics controller 8 through a DAC/LCDC 10. The computer 50 can be connected to a network via, for example, a communication adapter card 18 (for example, an Ethernet (registered trademark) card or a token ring card) and can communicate with another computer and the like. Also connected to the bus 2 are a serial port 15, a printer 16, and a timer 17.

It will be appreciated from the foregoing description that the computer 50 according to an embodiment can be implemented via general information processors, such as a personal computer, a workstation, and a mainframe, or a combination of them. The aforementioned components are illustrative, and all the components are not essential components of the present invention.

While the present invention has been described using an embodiment, the technical scope of the present invention is not limited to the description of the aforementioned embodiment. It is obvious to persons skilled in the art that various changes or improvements can be made in the aforementioned embodiment. Thus, the embodiment, in which such changes or improvements are made, is also covered by the technical scope of the present invention.

It should be noted that, regarding the execution sequence of processes, for example, operations, procedures, steps, and stages, in the devices, the systems, the programs, and the methods described in the claims, the description, and the drawings, expressions such as "before" and "preceding" are not explicitly given, and the devices, the systems, the programs, and the methods can be implemented with any sequence of processes unless the output of a preceding process is used by a following process. Moreover, it should be noted that, even when the output of a preceding process is used by a following process, another process may intervene between the preceding process and the following process, or even when a statement that another process intervenes between a preceding process and a following process is given, a change such that the preceding process is performed just before the following process can be made. Even when operation flows in the claims, the description, and the drawings are described using expressions such as "first", "next", and "subsequently" for convenience, this does not necessarily mean that such a sequence is required.

What is claimed is:

1. A defect predicate expression extraction method executed by a processor device for extracting predicate expressions representing defects from text data related to use of products, the method comprising:
   storing in a first predicate modifying expression storage unit, as predicate modifying expressions for detecting defect expressions, at least one of predicate modifying expressions representing suddenness and predicate modifying expressions representing repeatability;
   detecting, in said text data, expressions matching each of the said stored predicate modifying expressions for detecting defect expressions and extracting, as a candidate for a predicate expression representing a defect, a predicate expression occurring in a neighborhood of each of said detected expressions matching each of the said stored predicate modifying expressions for detecting defect expressions in said text data;
   storing in a second predicate modifying expression storage unit, as predicate modifying expressions for detecting normality expressions, predicate modifying expressions representing normality;
   detecting, in said text data, expressions matching each of the said stored predicate modifying expressions for detecting normality expressions and extracting, as a predicate expression representing normality, a predicate expression occurring in a neighborhood of each of the said detected expressions matching each of the said stored predicate modifying expressions for detecting normality expressions in said text data; and
   acquiring, as said predicate expressions representing defects, predicate expressions remaining after said extracted predicate expressions are removed from a list of said predicate expressions extracted as said candidates for said predicate expressions representing defects.

2. The defect predicate expression extraction method according to claim 1,
   wherein said predicate modifying expressions representing suddenness include at least one expression selected from the group consisting of: a predetermined number of predicate modifying expressions representing suddenness;
   wherein said predicate modifying expressions representing repeatability include at least one expression selected from the group consisting of: a predetermined number of predicate modifying expressions representing repeatability; and
   wherein said predicate modifying expressions representing normality include at least one expression selected from the group consisting of: a predetermined number of predicate modifying expressions representing normality.

3. The defect predicate expression extraction method according to claim 1,
   wherein extracting a candidate for a predicate expression representing a defect further comprises extracting a predicate expression directly modified by each of the said detected expressions matching each of the said stored predicate modifying expressions for detecting defect expressions; and
   wherein extracting a predicate expression representing normality further comprises extracting a predicate expression directly modified by each of the said detected expressions matching each of the said stored predicate modifying expressions for detecting normality expressions.

4. The defect predicate expression extraction method according to claim 1,
wherein extracting a candidate for a predicate expression representing a defect further comprises counting a number of occurrences of said predicate expression occurring in said neighborhood of at least one of the said predicate modifying expressions stored in said first predicate modifying expression storage unit;
wherein extracting a predicate expression representing normality further comprises counting a number of occurrences of said predicate expression occurring in a neighborhood of at least one of the said predicate modifying expressions stored in said second predicate modifying expression storage unit; and
wherein a same predicate expression is extracted as both representing a defect and representing normality, determining, on the basis of the respective numbers of occurrences of said counted predicate expression, whether to set said same predicate expression to be said predicate expression representing a defect.

5. The defect predicate expression extraction method according to claim 1, further comprising:
extracting, from said text data, predicate modifying expressions co-occurring with a predicate expression representing a specific defect; and
registering said predicate modifying expressions in said first predicate modifying expression storage unit.

6. The defect predicate expression extraction method according to claim 1, further comprising:
storing said predicate expressions representing defects in a defect predicate expression storage unit;
detecting, in said text data, expressions matching each of the said stored predicate expressions representing defects and extracting a noun expression occurring in a neighborhood of each of the said detected expressions matching each of the said stored predicate modifying expressions for detecting normality expressions in said text data; and
storing, in an analysis object storage unit, as an object to be analyzed, a pair of said detected expressions matching said predicate expression representing said defect and said extracted noun expression, in association with a frequency of extraction of said object to be analyzed.

7. The defect predicate expression extraction method according to claim 6, further comprising:
calculating a correlation value of each of the said stored objects to be analyzed; and
generating said correlation value of said object to be analyzed as an analysis result.

8. A defect predicate expression extraction device including a memory and a processor device configured to extract predicate expressions representing defects from text data related to use of products, comprising:
a predicate modifying expression storage unit for detecting defect expressions, wherein said predicate modifying expression storage unit stores at least one of predicate modifying expressions representing suddenness and predicate modifying expressions representing repeatability;
a defect predicate expression candidate extraction unit for detecting, in said text data, expressions matching each of the said predicate modifying expressions stored in said predicate modifying expression storage unit for detecting defect expressions, and extracting, as a candidate for a predicate expression representing a defect, a predicate expression occurring in a neighborhood of each of said detected expressions matching each of the said predicate modifying expressions stored in said predicate modifying expression storage unit for detecting defect expressions in said text data;
a predicate modifying expression storage unit for detecting normality expressions, wherein said predicate modifying expression storage unit stores predicate modifying expressions representing normality;
a normality predicate expression extraction unit for detecting, in said text data, expressions matching each of the said predicate modifying expressions stored in said predicate modifying expression storage unit for detecting normality expressions, and extracting, as a predicate expression representing normality, a predicate expression occurring in a neighborhood of each of the said detected expressions matching each of the said predicate modifying expressions stored in said predicate modifying expression storage unit for detecting normality expressions in said text data; and
a defect predicate expression acquisition unit for acquiring, as said predicate expressions representing defects, predicate expressions remaining after said predicate expressions extracted by said normality predicate expression extraction unit are removed from a list of said predicate expressions extracted as candidates for said predicate expressions representing defects.

9. The defect predicate expression extraction device according to claim 8,
wherein said predicate modifying expressions representing suddenness include at least one expression selected from the group consisting of: a predetermined number of predicate modifying expressions representing suddenness;
wherein said predicate modifying expressions representing repeatability include at least one expression selected from the group consisting of: a predetermined number of predicate modifying expressions representing repeatability; and
wherein said predicate modifying expressions representing normality include at least one expression selected from the group consisting of: a predetermined number of predicate modifying expressions representing normality.

10. The defect predicate expression extraction device according to claim 8,
wherein said defect predicate expression candidate extraction unit further extracts, as a candidate for said predicate expression representing said defect, a predicate expression directly modified by each of the said detected expressions matching each of the said predicate modifying expressions stored in said predicate modifying expression storage unit for detecting defect expressions; and
wherein said normality predicate expression extraction unit further extracts, as a predicate expression representing normality, a predicate expression directly modified by each of the said detected expressions matching each of the said predicate modifying expressions stored in said predicate modifying expression storage unit for detecting normality expressions.

11. The defect predicate expression extraction device according to claim 8,
wherein said defect predicate expression candidate extraction unit counts a number of occurrences of said predicate expression occurring in a neighborhood of at least one of the said predicate modifying expressions stored in said predicate modifying expression storage unit for detecting defect expressions;

wherein said normality predicate expression extraction unit counts a number of occurrences of said predicate expression occurring in a neighborhood of at least one of the said predicate modifying expressions stored in said predicate modifying expression storage unit for detecting normality expressions; and wherein in a case where a same predicate expression is extracted by both the said defect predicate expression candidate extraction unit and the said normality predicate expression extraction unit, said defect predicate expression acquisition unit determines, on the basis of the respective numbers of occurrences of said predicate expression counted by said defect predicate expression candidate extraction unit and said normality predicate expression extraction unit, whether to set the same predicate expression to be said predicate expression representing a defect.

12. The defect predicate expression extraction device according to claim 8, further comprising a predicate modifying expression registration unit for detecting defect expressions, said predicate modifying expression registration unit extracting, from text data related to use of products, predicate modifying expressions co-occurring with a predicate expression representing a specific defect and registering said predicate modifying expressions in said predicate modifying expression storage unit for detecting defect expressions.

13. The defect predicate expression extraction device according to claim 8, further comprising:
 a defect predicate expression storage unit for storing said predicate expressions representing defects acquired by said defect predicate expression acquisition unit;
 an analysis object extraction unit for detecting, in said text data to be analyzed, expressions matching each of the said predicate expressions representing defects stored in said defect predicate expression storage unit and extracting a noun expression occurring in a neighborhood of each of the said detected expressions matching each of the said predicate expressions representing defects stored in said defect predicate expression storage unit in said text data to be analyzed; and
 an analysis object storage unit for storing, as an object to be analyzed, a pair of said detected expressions matching said predicate expression representing said defect and said extracted noun expression, in association with a frequency of extraction of said object to be analyzed.

14. The defect predicate expression extraction device according to claim 13, further comprising an analysis result generation unit for calculating a correlation value of each of the said objects to be analyzed stored in said analysis object storage unit and generating said correlation value of said object to be analyzed as an analysis result.

15. A computer program product having a non-transitory computer readable medium tangibly embodying computer readable instructions which, when executed, cause a computer to carry out the steps of a method for extracting predicate expressions representing defects from text data related to use of products, the method comprising:
 storing in a first predicate modifying expression storage module, as predicate modifying expressions for detecting defect expressions, at least one of predicate modifying expressions representing suddenness and predicate modifying expressions representing repeatability;
 detecting, in said text data, expressions matching each of the said stored predicate modifying expressions for detecting defect expressions and extracting, as a candidate for a predicate expression representing a defect, a predicate expression occurring in a neighborhood of each of the said detected expressions matching each of the said stored predicate modifying expressions for detecting defect expressions in said text data;
 storing in a second predicate modifying expression storage module, as predicate modifying expressions for detecting normality expressions, predicate modifying expressions representing normality;
 detecting, in said text data, expressions matching each of the said stored predicate modifying expressions for detecting normality expressions and extracting, as a predicate expression representing normality, a predicate expression occurring in a neighborhood of each of the said detected expressions matching each of the said stored predicate modifying expressions for detecting normality expressions in said text data; and
 acquiring, as said predicate expressions representing defects, predicate expressions remaining after said extracted predicate expressions are removed from a list of said predicate expressions extracted as said candidates for said predicate expressions representing defects.

16. The computer program product according to claim 15,
 wherein said predicate modifying expressions representing suddenness include at least one expression selected from the group consisting of: a predetermined number of predicate modifying expressions representing suddenness;
 wherein said predicate modifying expressions representing repeatability include at least one expression selected from the group consisting of: a predetermined number of predicate modifying expressions representing repeatability; and
 wherein said predicate modifying expressions representing normality include at least one expression selected from the group consisting of: a predetermined number of predicate modifying expressions representing normality.

17. The computer program product according to claim 15,
 wherein extracting a candidate for a predicate expression representing a defect further comprises extracting a predicate expression directly modified by each of the said detected expressions matching each of the said stored predicate modifying expressions for detecting defect expressions; and
 wherein extracting a predicate expression representing normality further comprises extracting a predicate expression directly modified by each of the said detected expressions matching each of the said stored predicate modifying expressions for detecting normality expressions.

18. The computer program product according to claim 15,
 wherein extracting a candidate for a predicate expression representing a defect further comprises counting a number of occurrences of said predicate expression occurring in said neighborhood of at least one of the said predicate modifying expressions stored in said first predicate modifying expression storage module;
 wherein extracting a predicate expression representing normality further comprises counting a number of occurrences of said predicate expression occurring in a neighborhood of at least one of the said predicate modifying expressions stored in said second predicate modifying expression storage module; and wherein a same predicate expression is extracted as both representing a defect and representing normality, determining, on the basis of the respective numbers of occurrences of said counted predicate expression, whether to set said same predicate expression to be said predicate expression representing a defect.

19. The computer program product according to claim 15, further comprising computer readable program code configured to perform the steps of:
   extracting, from said text data, predicate modifying expressions co-occurring with a predicate expression representing a specific defect; and
   registering said predicate modifying expressions in said first predicate modifying expression storage module.

20. The computer program product according to claim 15, further comprising computer readable program code configured to perform the steps of:
   storing said predicate expressions representing defects in a defect predicate expression storage module;
   detecting, in said text data, expressions matching each of the said stored predicate expressions representing defects and extracting a noun expression occurring in a neighborhood of each of the said detected expressions matching each of the said stored predicate expressions representing defects in said text data;
   storing, in an analysis object storage module, as an object to be analyzed, a pair of said detected expressions matching said predicate expression representing said defect and said extracted noun expression, in association with a frequency of extraction of said object to be analyzed;
   calculating a correlation value of each of the said stored objects to be analyzed; and
   generating said correlation value of said object to be analyzed as an analysis result.

* * * * *